US007083203B2

(12) United States Patent
Glaser et al.

(10) Patent No.: US 7,083,203 B2
(45) Date of Patent: Aug. 1, 2006

(54) CONNECTING ELEMENT FOR CONNECTING A FUEL LINE TO A FUEL INJECTOR

(75) Inventors: Andreas Glaser, Stuttgart (DE); Jochen Staiger, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/296,652

(22) PCT Filed: Mar. 27, 2002

(86) PCT No.: PCT/DE02/01130

§ 371 (c)(1),
(2), (4) Date: Jun. 9, 2003

(87) PCT Pub. No.: WO02/077439

PCT Pub. Date: Oct. 3, 2002

(65) Prior Publication Data

US 2004/0021009 A1 Feb. 5, 2004

(30) Foreign Application Priority Data

Mar. 27, 2001 (DE) ................................ 101 15 048

(51) Int. Cl.
*F16L 21/00* (2006.01)

(52) U.S. Cl. ...................... 285/231; 285/338; 285/347; 285/334.4

(58) Field of Classification Search ................ 285/374, 285/349, 334.1, 334.4, 231, 338, 261, 347, 285/145.3, 146.1, 146.3, 148.1, 237
See application file for complete search history.

(56) References Cited

U.S. PATENT DOCUMENTS

| | | | | | |
|---|---|---|---|---|---|
| 1,057,939 | A | * | 4/1913 | Cooper | 285/261 |
| 2,428,143 | A | * | 9/1947 | Chavayda | 285/233 |
| 3,112,939 | A | * | 12/1963 | Graham | 285/374 |
| 3,376,053 | A | * | 4/1968 | Novakovich et al. | 285/92 |
| 3,427,051 | A | * | 2/1969 | White et al. | 285/261 |
| 3,515,414 | A | * | 6/1970 | Kowalewski | 285/261 |
| 3,565,465 | A | * | 2/1971 | Wemyss | 285/374 |
| 3,874,706 | A | * | 4/1975 | Arnold | 285/261 |
| 6,155,608 | A | * | 12/2000 | Skinner et al. | 285/125.1 |
| 6,217,084 | B1 | * | 4/2001 | Larsson et al. | 285/374 |

FOREIGN PATENT DOCUMENTS

| | | |
|---|---|---|
| DE | 197 35 665 | 1/1999 |
| EP | 1 150 002 | 10/2001 |
| WO | WO 99 00595 | 1/1999 |
| WO | WO 99 31381 | 6/1999 |
| WO | WO 01 18384 | 3/2001 |

* cited by examiner

*Primary Examiner*—David Bochna
(74) *Attorney, Agent, or Firm*—Kenyon & Kenyon LLP

(57) ABSTRACT

A connecting element for connecting a fuel line to a fuel injector having a first connecting sleeve, which may be inserted into a receiver opening in the fuel line, and a first sealing element positioned on the first connecting sleeve. The connecting element may have a second connecting sleeve, on the end diametrically opposed to the first connecting sleeve, which may be inserted into a recess in the fuel injector and on which a second sealing element is positioned. A radially expanded region may be formed between the first and second connecting sleeves, whose transition to at least one of the two connecting sleeves may be formed as a first contact surface, which, when the connecting element is mounted, may be in contact with a corresponding surface on one of the adjoining components.

14 Claims, 2 Drawing Sheets

CONNECTING ELEMENT FOR CONNECTING A FUEL LINE TO A FUEL INJECTOR

FIELD OF THE INVENTION

The present invention is directed to a connecting element for connecting a fuel line to a fuel injector.

BACKGROUND INFORMATION

For connecting a fuel injector to a fuel line, due to the installation situation, a connecting element may be necessary between the fuel injector and the fuel supply line for compensating the position tolerance. This is true, for example, in direct-injection internal combustion engines, which supply multiple fuel injectors with fuel via a shared fuel line, the fuel rail.

A fuel injection system having one adapter per injector is described in German Patent Application No. 197 35 665. The adapter described there has two different connections. On one side, the adapter has a connecting sleeve which may be inserted into an opening of the fuel line. On the opposite end, a receiver opening is introduced into the adapter, into which the connection side of the fuel injector may be inserted. In this case, the receiver opening has, for example, an internal geometry which is identical to the opening in the fuel line. The adapter thus acts like an extension of the fuel injector or of the connecting sleeve of the fuel line. A peripheral shoulder is made on the outside of the adapter, via which the adapter may be connected to the fuel line by a holding clamp and secured against slipping out.

The adapter is sealed by two sealing elements, which may be formed as O-rings. The first sealing element, which is used to seal the adapter in relation to the fuel line, is positioned in a groove on the connecting sleeve of the adapter in this case. In contrast, the seal between the fuel injector and the adapter is produced by a second sealing element positioned on the fuel injector.

Using the adapter described in German Patent Application No. 197 35 665, it may be necessary to fix the adapter on the fuel rail using a holding clamp. This requires not only an additional work step during the assembly of the internal combustion engine, but also additional expenditure for parts. In addition, the spacer may need to be inserted with a certain orientation during assembly.

Furthermore, the limited elasticity of the holding clamp results in the adapter having force applied to it unequally in the event of tilting of the adapter in relation to the fuel line, so that pinching of the sealing element and, finally, failure of the sealing element, may occur.

An additional clamping shoe may be necessary to fix the fuel injector in the cylinder head of the internal combustion engine. The adapter is unable to transmit axial forces and, due to its restricted movability, is only able to compensate position tolerances to a limited degree. For example, in long fuel rails, temperature variations which may occur during operation of an internal combustion engine result in relatively large changes in length of the fuel line and, for example, in long fuel rails, to changes in length of the connecting sleeves which cannot be compensated for.

SUMMARY OF THE INVENTION

An example connecting element according to the present invention, due to the design of the connecting element having two diametrically opposed connecting sleeves and the contact surfaces formed between them, may not require a separate holding clamp. The connecting element is fixed in its position between the fuel injector and the fuel line by the contact surfaces. Position tolerances or changes in length of the fuel line due to temperature variations do not result in forces being introduced asymmetrically into the sealing elements, because of the lack of additional fixing.

The design of at least one of the two surfaces as a section of a spherical surface allows rotation of the connecting element around a defined center of rotation. If both contact surfaces are designed in spherical geometry and the centers of the spherical geometries lie in the plane of the sealing elements, the connecting element may tilt resulting from the uniform load of the sealing elements. Therefore, for repeated loading which arises due to temperature expansion of the rail premature wear of the sealing elements may be prevented.

It is possible to transmit a force which presses the fuel injector against the cylinder head using the connecting element on the fuel injector. In this way, the fuel injector may be held securely in the cylinder head without further mounting elements. The clamping shoes typically used may be dispensed with, through which, in addition to the material costs, further processing steps may be unnecessary, e.g., cutting threads in the cylinder head for screwing in the clamping shoe.

Forming different faces on the side of the fuel line and the side of the fuel injector allows the force resulting therefrom to be used to elevate the pressure on the fuel injector.

Simple mounting is possible if a connecting element is used in which both connecting sleeves have an identical geometry. The connecting element may be mounted in any desired way. The orientation of the component as an additional work step before insertion may thus be dispensed with.

DETAILED DESCRIPTION

Figure 1:
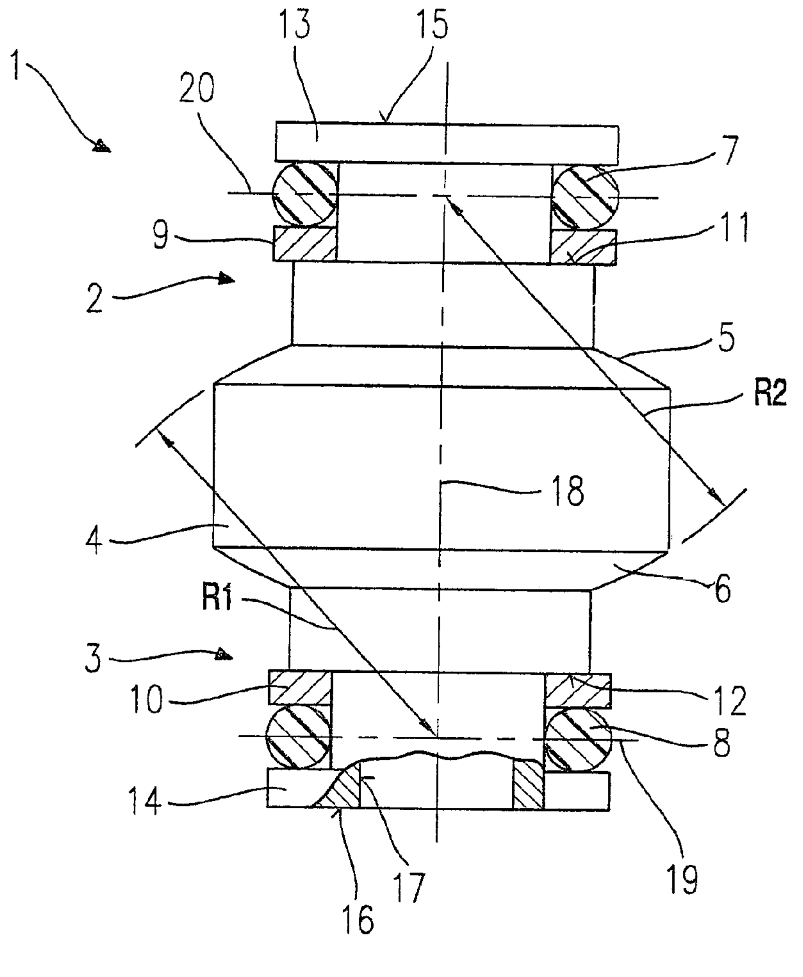
FIG. 1 shows a schematic partial section through an exemplary embodiment of a connecting element according to the present invention.

A schematic illustration of an example embodiment of a connecting element according to the present invention for connecting a fuel injector to a fuel line is shown in FIG. 1. Connecting element 1 may include three sections. A first connecting sleeve 2, a radially expanded region 4, and a second connecting sleeve 3 may be positioned sequentially in the axial direction.

First connecting sleeve 2 has a reduction of its radial dimension in the direction of the end of connecting element 1 and thus forms a first shoulder 11. A first supporting disk 9, whose internal radial dimension is smaller than the radial dimension of first connecting sleeve 2 on the side of expanded region 4, may be positioned on first shoulder 11. The external radial dimension of first supporting disk 9 is larger than the maximum radial dimension of first connecting sleeve 2. The outer end of first connecting sleeve 2 may be formed as a first collar 13, whose external radial dimension corresponds, for example, to the external radial dimension of first supporting disk 9. The radial dimensions of first collar 13 and first supporting disk 9 may be sufficiently smaller than the internal radial dimension of the receiver opening of the adjoining component (e.g., of the receiving connecting sleeve of the fuel line), that connecting element 1 may be slanted by a specific angle in relation to the receiving component without first supporting disk 9 or first collar 13 hitting the inner wall of the adjoining component.

First collar 13 and first supporting disk 9 may be separated in the axial direction. A first sealing element 7 may be positioned in the resulting gap. An O-ring may be used, for example, as first sealing element 7, as shown in FIG. 1. The height and radial dimension of the gap formed between first supporting disk 9 and first collar 13 may be dimensioned to correspond to the nominal size of the O-ring to be used.

At the opposite end of connecting element 1, a second sealing element 8 may be positioned between a second collar 14, which is positioned on the end of connecting element 1, and a second supporting disk 10, which rests on a second collar 12. The external radial dimensions are again dimensioned so that second connecting sleeve 3 may be tilted in the receiver opening of the adjoining component (e.g., of the fuel injector) by a specific angle, without second supporting disk 10 or second collar 14 striking against the inner wall of the receiver opening. The geometries of first and second connecting sleeves 2 and 3 may be identical, so that a symmetrical connecting element 1 results, whose orientation does not have to be established during installation.

For mounting of supporting disks 9 and 10, connecting element 1 may, for example, have multiple parts. For example, first and second collar 13 and 14 may be designed as individual components together with the part of first or second connecting sleeve 2 or 3 which is reduced in the radial dimension and, after placement of supporting disks 9 and 10, may be pressed into the middle part of connecting element 1.

Supporting disks 9, 10 are, for example, slotted and have an external diameter which is larger than the opening of the adjoining component. Due to the slotted design, supporting disks 9, 10 press against the outer diameter of the hole of the adjoining component. With a proper layout of supporting disks 9, 10, a gap to connecting sleeves 2, 3 of connecting element 1 remains at the internal diameter.

A first contact surface 5, whose geometry corresponds to a section of a spherical surface, may be formed as a transition from first connecting sleeve 2 to expanded region 4. The center of this spherical geometry having first radius R1 is, for example, identical to the intersection of central axis 18 of connecting element 1 and central plane 19 of second sealing element 8. The transition from second connecting sleeve 3 to expanded region 4 may also be formed as a section of a spherical surface, its center, for example, being identical to the intersection of central axis 18 of connecting element 1 with central plane 20 of first sealing element 7, and the spherical surface having a second radius R2.

When connecting element 1 has been installed, the two contact surfaces 5 and 6 are each supported on a corresponding surface on the fuel line and the fuel injector. A force may thus be exerted by the fuel line on the fuel injector in the axial direction. The fuel injector may be thus fixed in the cylinder head by connecting element 1. The forces necessary to keep the fuel injector fixed in the cylinder head are absorbed, on the side diametrically opposed to the fuel injector, by the fuel line, which is attached to the internal combustion engine. In the event of position tolerances, which may arise during manufacture, connecting element 1 may slant between the fuel line and the fuel injector. In this case, connecting element 1 rotates around both centers of spherical contact surfaces 5 and 6. Furthermore, the spherical geometry of both contact surfaces 5 and 6 ensures a uniform supporting surface in this case. The radii of both contact surfaces 5 and 6 are selected in accordance with the corresponding surfaces on the fuel line and the fuel injector.

Figure 2:
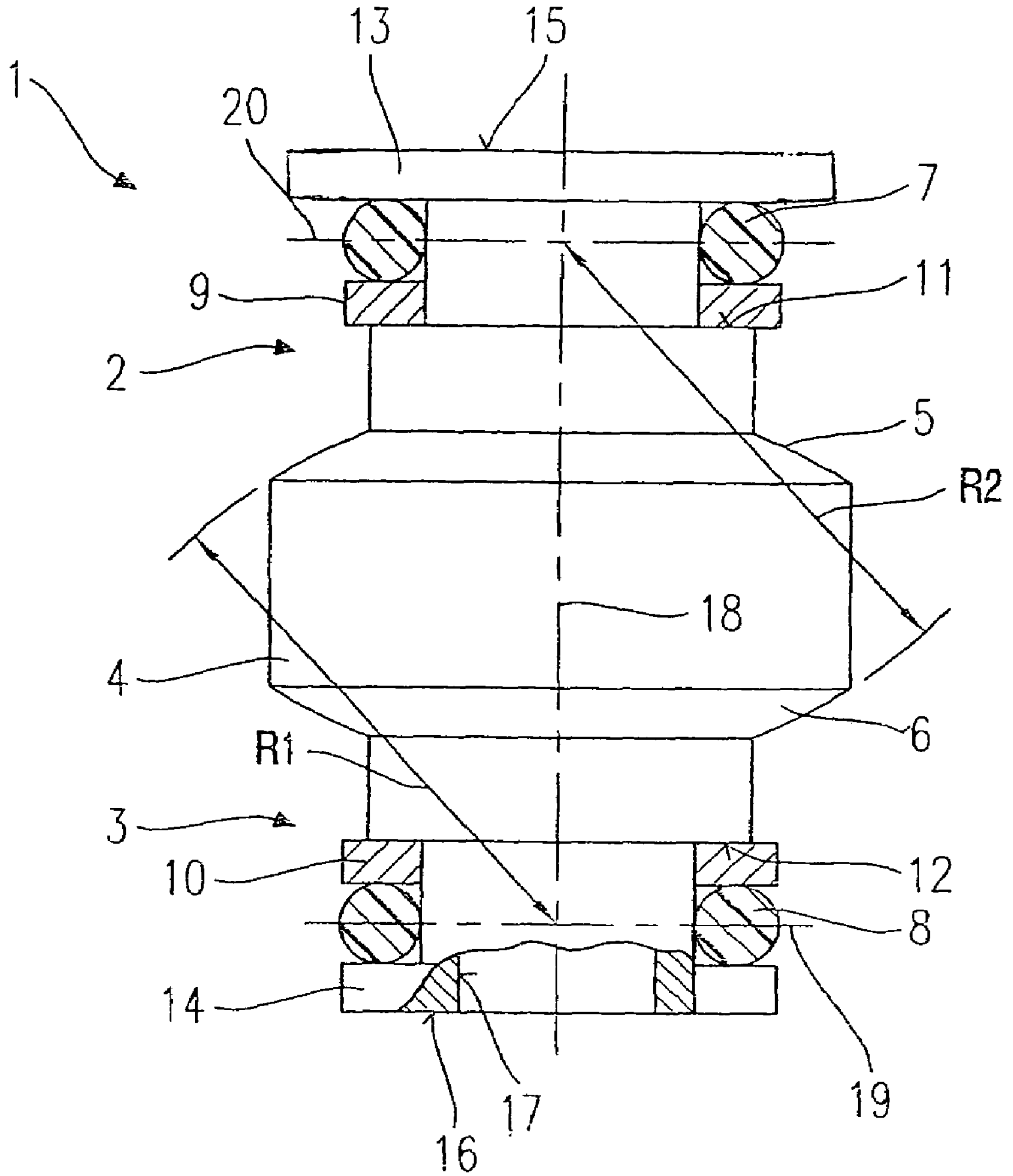
FIG. 2 shows a schematic partial section through an alternative exemplary embodiment of a connecting element according to the present invention.

A first and a second face 15 and 16 are formed on the two ends of connecting element 1. Both faces 15 and 16 may have different sizes as shown in FIG. 2. If both differently sized faces 15 and 16 have the fuel pressure applied to them, a resulting force arises on connecting element 1 in the direction of smaller face 15 or 16. This resulting force may be used to increase the force with which the fuel injector is held in the cylinder head. Connecting element 1 may have an inner through hole 17 in order to ensure the fuel flow from the fuel distributor to the fuel injector.

What is claimed is:

1. A connecting element for connecting a fuel line to a fuel injector, comprising:

a first connecting sleeve configured to be inserted into a receiver opening in the fuel line;

a first sealing element disposed on the first connecting sleeve;

a second connecting sleeve disposed on an end diametrically opposed to the first connecting sleeve configured to be inserted into a recess in the fuel injector;

a second sealing element disposed on the second connecting sleeve; and a radially expanded region disposed between the first and second connecting sleeves, the radially expanded region having a transition to at least one of the two connecting sleeves and forming a first contact surface wherein, in a mounted position, the first contact surface is in contact with a corresponding surface of an adjoining component, wherein:

the transition forms a second contact surface, the first and second contact surfaces are each in contact with a corresponding surface on a respective one of the fuel injector and the fuel line, at least one of the two contact surfaces is configured as a section of a spherical surface, the spherical surface has a constant radius, and a center of the spherical surface lies on a central axis of the connecting element.

2. The connecting element according to claim 1, wherein the two contact surfaces are configured to transmit a force from the fuel line onto the fuel injector in an axial direction.

3. The connecting element according to claim 1, wherein the first and second connecting sleeves have faces with cross-sections of different sizes and the connecting element is configured to exert an axial force in accordance with a fuel pressure and an area ratio.

4. The connecting element according to claim 1, wherein the two connecting sleeves are configured to have identical geometries.

5. The connecting element according to claim 1, wherein, in the mounted position, the at least one of the two contact surfaces is configured to enable the connecting element to rotate.

6. The connecting element according to claim 5, wherein the connecting element is configured to rotate about a center of the spherical surface.

7. The connecting element according to claim 1, wherein a radial dimension of at least one of the first connecting sleeve and the second connecting sleeve is reduced in a direction towards an end face of the at last one of the first connecting sleeve and the second connecting sleeve.

8. The connecting element according to claim 7, further comprising:

at least one supporting disk, wherein the reduction in the radial dimension of each of the at least one of the first connecting sleeve and the second connecting sleeve forms a corresponding shoulder, and wherein each of the at least one disk is positioned on a corresponding one of the corresponding shoulders.

9. The connecting element according to claim 8, wherein the at least one supporting disk includes a first supporting disk positioned on a shoulder of the first connecting sleeve, and a second supporting disk positioned on a shoulder of the second connecting sleeve, wherein the first sealing element is positioned between the first supporting disk and an end face of the first connecting sleeve, and wherein the second sealing element is positioned between the second supporting disk and an end face of the second connecting sleeve.

10. The connecting element according to claim 1, wherein at least one of the first sealing element and the second sealing element is an O-ring.

11. A connecting element for connecting a fuel line to a fuel injector, comprising:

a first connecting sleeve configured to be inserted into a receiver opening in the fuel line;

a first sealing element disposed on the first connecting sleeve;

a second connecting sleeve disposed on an end diametrically opposed to the first connecting sleeve configured to be inserted into a recess in the fuel injector;

a second sealing element disposed on the second connecting sleeve; and a radially expanded region disposed between the first and second connecting sleeves, the radially expanded region having a transition to at least one of the two connecting sleeves and forming a first contact surface wherein, in a mounted position, the first contact surface is in contact with a corresponding surface of an adjoining component, wherein:

the transition forms a second contact surface, the first and second contact surfaces are each in contact with a corresponding surface on a respective one of the fuel injector and the fuel line, at least one of the two contact surfaces is configured as a section of a spherical surface, the spherical surface has a constant radius, and a center of the spherical surface lies on a central axis of the connecting element and on a central plane of the sealing element on a side facing away from the corresponding contact surface.

12. A connecting element for connecting a fuel line to a fuel injector, comprising:

a first connecting sleeve configured to be inserted into a receiver opening in the fuel line;

a first sealing element disposed on the first connecting sleeve;

a second connecting sleeve disposed on an end diametrically opposed to the first connecting sleeve configured to be inserted into a recess in the fuel injector;

a second sealing element disposed on the second connecting sleeve;

a radially expanded region disposed between the first and second connecting sleeves, the radially expanded region having a transition to at least one of the two connecting sleeves and forming a first contact surface wherein, in a mounted position, the first contact surface is in contact with a corresponding surface of an adjoining component; and at least one supporting disk, wherein:

the transition forms a second contact surface, the first and second contact surfaces are each in contact with a corresponding surface on a respective one of the fuel injector and the fuel line, at least one of the two contact surfaces is configured as a section of a spherical surface, the spherical surface has a constant radius, a center of the spherical surface lies on a central axis of the connecting element, a radial dimension of at least one of the first connecting sleeve and the second connecting sleeve is reduced in a direction towards an end face of the at last one of the first connecting sleeve and the second connecting sleeve, the reduction in the radial dimension of each of the at least one of the first connecting sleeve and the second connecting sleeve forms a corresponding shoulder, each of the at least one disk is positioned on a corresponding one of the corresponding shoulders, and an external radial dimension of the end face is equivalent to an external radial dimension of the at least one supporting disk.

13. The connecting element according to claim 12, wherein an internal radial dimension of the at least one supporting disk is smaller than an external radial dimension of a portion of the at least one of the first connecting sleeve and the second connecting sleeve that is positioned between the at least one supporting disk and the radially expanded region.

14. The connecting element according to claim 13, wherein the external radial dimension of the at least one supporting disk is larger than the external radial dimension of the portion of the at least one of the first connecting sleeve and the second connecting sleeve that is positioned between the at least one supporting disk and the radially expanded region.

* * * * *